United States Patent
DiMartino et al.

(10) Patent No.: US 9,943,915 B2
(45) Date of Patent: Apr. 17, 2018

(54) FORMING CLOSELY SPACED ANNULAR INTERNAL CORRUGATIONS IN CIRCULAR WAVEGUIDES

(71) Applicant: General Atomics, San Diego, CA (US)

(72) Inventors: Michelangelo DiMartino, La Mesa, CA (US); Charles P. Moeller, Del Mar, CA (US)

(73) Assignee: General Atomics, San Diego, CA (US)

(*) Notice: Subject to any disclaimer, the term of this patent is extended or adjusted under 35 U.S.C. 154(b) by 0 days.

(21) Appl. No.: 15/793,947

(22) Filed: Oct. 25, 2017

(65) Prior Publication Data

US 2018/0043443 A1 Feb. 15, 2018

Related U.S. Application Data

(63) Continuation of application No. 15/158,219, filed on May 18, 2016, now Pat. No. 9,844,820.

(51) Int. Cl.
| | |
|---|---|
| *B23C 3/34* | (2006.01) |
| *B23C 3/02* | (2006.01) |
| *H01P 3/12* | (2006.01) |
| *B23C 3/28* | (2006.01) |

(52) U.S. Cl.
CPC .............. *B23C 3/02* (2013.01); *B23C 3/34* (2013.01); *H01P 3/12* (2013.01); *B23C 3/28* (2013.01); *B23C 2220/36* (2013.01); *B23C 2220/40* (2013.01); *B23C 2265/12* (2013.01)

(58) Field of Classification Search
CPC .... B23C 3/00; B23C 3/02; B23C 3/28; B23C 3/34; B23C 2220/36; B23C 2210/326; Y10T 279/17017; Y10T 408/665
See application file for complete search history.

(56) References Cited

U.S. PATENT DOCUMENTS

| | | | |
|---|---|---|---|
| 2,501,217 A | 3/1950 | Hawn | |
| 2,671,381 A | 3/1954 | Carlson | |
| 4,014,439 A | 3/1977 | Kochsiek | |
| 4,260,306 A | 4/1981 | Weis | |
| 4,557,644 A | 12/1985 | Scepanovic | |
| 4,568,313 A | 2/1986 | Diffenderfer | |
| 4,786,759 A | 11/1988 | Gouverneur | |
| 4,838,742 A | 6/1989 | Fricker | |
| 5,159,862 A | 11/1992 | Byrnes | |
| 5,429,345 A | 7/1995 | Yang | |
| 5,597,276 A | 1/1997 | Yokell | |

(Continued)

OTHER PUBLICATIONS

DiMartino; U.S. Appl. No. 15/158,219, filed May 18, 2016.

(Continued)

*Primary Examiner* — Daniel Howell
*Assistant Examiner* — Yasir Diab
(74) *Attorney, Agent, or Firm* — Fitch, Even, Tabin & Flannery LLP (57) ABSTRACT

An apparatus for cutting annular corrugations in an interior surface of a cylindrical tube having a cutter head comprising a plurality of cutting teeth; a drive shaft coupled to the cutter head for spinning the cutter head; a mandrel coupled to the cutter head, wherein the mandrel defines a longitudinal axis, wherein an axis of rotation of the cutter head is parallel to, but in a position not coaxial with the axis of rotation of the cutter head; an outer eccentric coupled to mandrel, wherein the outer eccentric rotates the mandrel, wherein the axis of rotation orbits around the longitudinal axis.

17 Claims, 9 Drawing Sheets

(56) References Cited

U.S. PATENT DOCUMENTS

| | | | |
|---|---|---|---|
| 5,733,078 | A | 3/1998 | Matsushita |
| 6,164,877 | A | 12/2000 | Kamata |
| 6,990,878 | B2 | 1/2006 | Ricci |
| 7,347,652 | B2 | 3/2008 | Giovanelli |
| 8,276,488 | B2 | 10/2012 | Backhouse |
| 9,038,723 | B2 | 5/2015 | Trudeau |
| 9,103,088 | B2 | 8/2015 | Clark, II |
| 2003/0102139 | A1 | 6/2003 | Debat |
| 2004/0240951 | A1 | 12/2004 | Roberts |
| 2005/0204879 | A1 | 9/2005 | Kwech |
| 2007/0292227 | A1 | 12/2007 | Giovanelli |
| 2011/0081211 | A1 | 4/2011 | Frecska |

OTHER PUBLICATIONS

USPTO; Non-final office action issued in U.S. Appl. No. 15/158,219 dated Jun. 16, 2017.
USPTO; Notice of Allowance issued in U.S. Appl. No. 15/158,219 dated Aug. 28, 2017.

FORMING CLOSELY SPACED ANNULAR INTERNAL CORRUGATIONS IN CIRCULAR WAVEGUIDES

This application is a continuation of U.S. application Ser. No. 15/158,219, filed May 18, 2016, for FORMING CLOSELY SPACED ANNULAR INTERNAL CORRUGATIONS IN CIRCULAR WAVEGUIDES, which is incorporated in its entirety herein by reference.

BACKGROUND OF THE INVENTION

1. Field of the Invention

The present invention relates generally to forming circular waveguides, and more specifically to forming closely spaced annular corrugations in circular waveguides. Even more specifically, the present invention relates to simultaneously cutting multiple closely spaced annular internal corrugations in circular waveguides.

2. Discussion of the Related Art

The term waveguide refers to any linear structure that guides electromagnetic waves from one end of the waveguide to the other end of the waveguide. Waveguides are generally hollow, and are generally used on electromagnetic waves in the microwave spectrum, e.g., in the range 300 MHz (100 cm) to 300 GHz (0.1 cm).

U.S. Pat. No. 3,754,273 teaches a circular waveguide with a corrugated inner wall surface with corrugated slots.

SUMMARY OF THE INVENTION

Several embodiments of the invention advantageously address the needs above as well as other needs by providing a system and method for simultaneously cutting multiple closely spaced annular internal corrugations in circular waveguides.

In one embodiment, the invention can be characterized as an apparatus for cutting annular corrugations in an interior surface of a cylindrical tube having a cutter head comprising a plurality of cutting teeth; a drive shaft coupled to the cutter head for spinning the cutter head; a mandrel coupled to the cutter head, wherein the mandrel defines a longitudinal axis, wherein an axis of rotation of the cutter head is parallel to, but in a position not concentric with the axis of rotation of the cutter head; an outer eccentric coupled to the mandrel, wherein the outer eccentric rotates the mandrel, wherein the axis of rotation orbits around the longitudinal axis.

In another embodiment, the invention can be characterized as a method of forming corrugations on an interior surface of a cylindrical tube having the steps of inserting a cutter head into the cylindrical tube; inserting a mandrel into the cylindrical tube following the cutter head; directing the cutter head to a furthest position within the cylindrical tube at which said corrugations are to be formed; spinning the cutter head; off-setting the axis of rotation of the cutter head and a longitudinal axis of the circular tube while maintaining the axis of rotation parallel to the longitudinal axis, wherein cutting teeth of the cutter head are brought into contact with the inner surface; and orbiting the axis of rotation of the cutter head around the longitudinal axis while maintaining the axis of rotation parallel to the longitudinal axis, wherein the cutting teeth of the cutter head traverse the circumference of the inner surface, wherein corrugations of uniform depth and spacing are formed in annular pattern around the interior surface.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
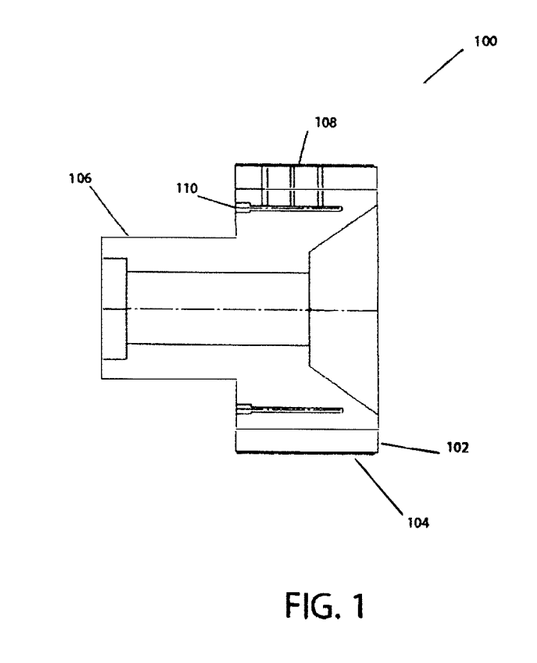
FIG. 1 is a side cross-sectional view of a cutter head in accordance with a first embodiment of the present invention.

Referring first to FIG. 1, a side cross-sectional view is shown of a cutter head 100 in accordance with a first embodiment of the present invention.

Shown is a cutter head 100, a carbide bar 102, cutting teeth 104, a shank 106, a plurality of cutting fluid exit holes 108, and a cutting fluid manifold 110.

The carbide bar 102 is one of eight such carbide bars 102 that are positioned at equiangular distances around the periphery of the cutter head 100, only one of which is depicted in the cross sectional view of FIG. 1.

The cutter head 100 is of larger diameter than the shank 106.

In operation, the cutter head 100 is spun by a motive force supplied to the shank 106, as described hereinafter. The cutting teeth 104 of the carbide bar 102 are applied against an inner circumference of a circular tube, such as a circular waveguide. The cutting teeth 104 cut corrugations in the interior surface of the circular tube. The inner diameter of the circular tube is larger than the outer diameter of the cutting teeth 104 of the cutter head 100, and in operation, the cutter head 100 is slowly orbited about the interior surface of the circular tube as the cutter head 100 is spun so as to cut corrugations on the interior surface of the circular tube.

Circular waveguides are used to transfer microwave power in many applications. At the higher microwave frequencies, e.g., 10s of GHz and above, it becomes advantageous to have closely spaced internal annular grooves or corrugations of a specific pitch and depth, depending on the frequency, to reduce attenuation from the finite electrical conductivity of the metal from which the waveguide is made. Efficiently producing these corrugations in tubes that are many internal diameters long, e.g., at least 10 or more, is a challenge. The benefits of the embodiments described herein are especially evident when the frequency is over 100 GHz and the annular corrugations have sub-millimeter dimensions. The typical diameter of the circular waveguide used above 100 GHz is 30 to 70 mm. The optimum corrugation depth is $\lambda/4$, where $\lambda=f/c$ is free space wavelength, f is the frequency and c the velocity of light. The pitch p of the corrugations is optimally $\geq \lambda/4$ but $<\lambda/2$. The groove width is typically $>p/2$. That is, the groove width is greater than the land width. The optimum groove dimensions are not affected by the choice of tube material. The material only affects the ease of machining.

In various embodiments, the invention consists of a multi-toothed ganged rotary cutter (cutter head 100) that orbits the inner surface of the circular tube, rotating about the longitudinal axis of the cutter head 100 many hundreds of times during one orbit around the tube inner circumference, and mechanisms for driving and supporting this cutter head 100 so that the ganged cutting teeth 104 produce grooves (corrugations) of uniform depth. Furthermore, these ganged cutting teeth 104 are shaped so that the resulting grooves are free of burrs and the bottom of the grooves are concentric with the inner diameter of the tube being grooved.

Hollow cylindrical metal tubes (referred to as circular waveguides) are frequently used to transfer radio frequency or microwave power, usually of wavelength less than 1 m (~0.3 Ghz), from a source to a load such as an antenna. The attenuation of the power propagating through the waveguide can be greatly reduced if the inner wall has annular equally spaced corrugations of the proper period. The optimum corrugation depth is $\lambda/4$. The pitch p of the corrugations is optimally $\geq \lambda/4$ but $<\lambda/2$.

In accordance with certain embodiments, the invention is an apparatus to efficiently form such corrugations in tubes the lengths of which are many tens of times their inner diameters, e.g., at least about 30 times their inner diameter, where using a conventional machine such as a lathe is impractical. The benefits of this apparatus are especially evident when the microwave wavelength is a few millimeters (frequency is hundreds of GHz) and the annular corrugations have sub-millimeter dimensions.

Figure 2:
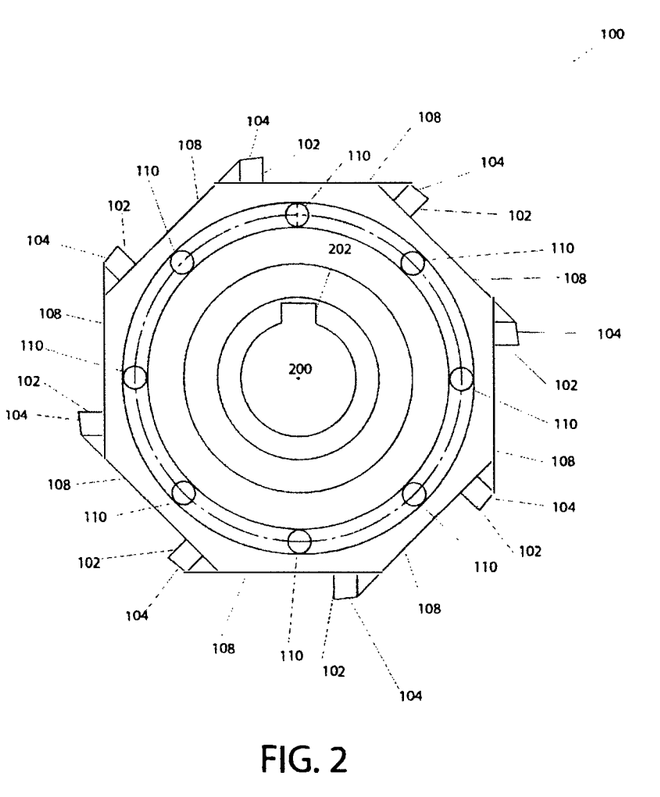
FIG. 2 is a front end view of the cutter head in accordance with the first embodiment of FIG. 1.

Referring next to FIG. 2, a back end view is shown of the cutter head 100 in accordance with the first embodiment of FIG. 1.

Shown is the cutter head 100, carbide bars 102, and the cutting teeth 104. Also showing is a central hole 200 and a key notch 202.

As mentioned above, the carbide bars 102 are positioned about the circumference of the cutter head 100 at equiangular spacing. In the example shown, this spacing is 45 degrees. The drive shaft is inserted in the central hole 200 and the rotational force is applied against the key notch 202 as to spin the cutter head 100.

Optimally, the tube will be vertical with the cutter facing down (below the shank), with the cutting fluid exiting down, and with the cutter starting at the bottom of the tube. That way, the mandrel is supported by the smooth wall, yet to be corrugated length of the tube. Having the cutter starting at the bottom and working upward with cutting fluid and chips flowing down greatly facilitates their removal. A large volume of chips is produced during the corrugating operation.

In operation, the spinning cutter head 100 is applied to the interior surface of the circular tube, such as a circular waveguide, so that the cutting teeth 104 are applied to the interior surface as the cutter head 100 spins, cutting interior corrugations into the interior surface.

Also shown are a plurality of cutting fluid exit holes 108 coupled to cutting fluid manifold 204 that provide an exit pathway toward the front of the cutter head 100, i.e., away from the shank 106, for tailings or cuttings that result from the cutting of the interior groves by the cutting teeth 104 on the interior of the circular tube.

Figure 3:
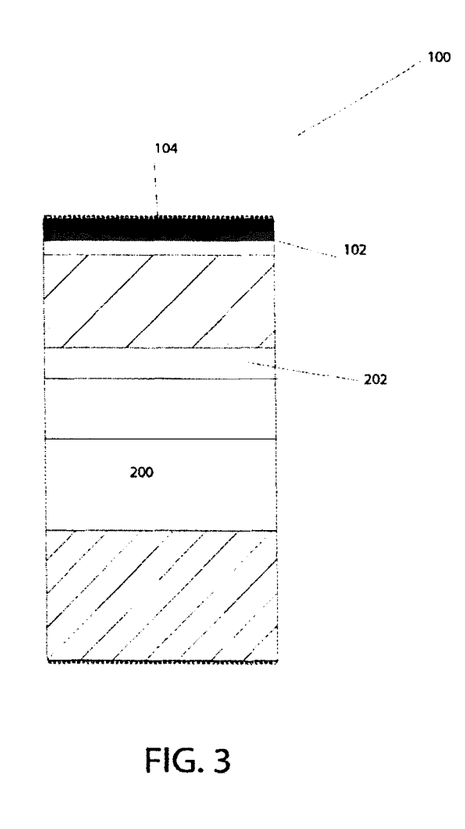
FIG. 3 is a side cross-sectional view of a cutter head in accordance with the first embodiment of the present invention of FIG. 1.

Referring next to FIG. 3, a side cross-sectional view is shown of a cutter head 100 in accordance with the first embodiment of the present invention.

Shown is the cutter head 100, the carbide bar 102, and the cutting teeth 104.

Figure 4:
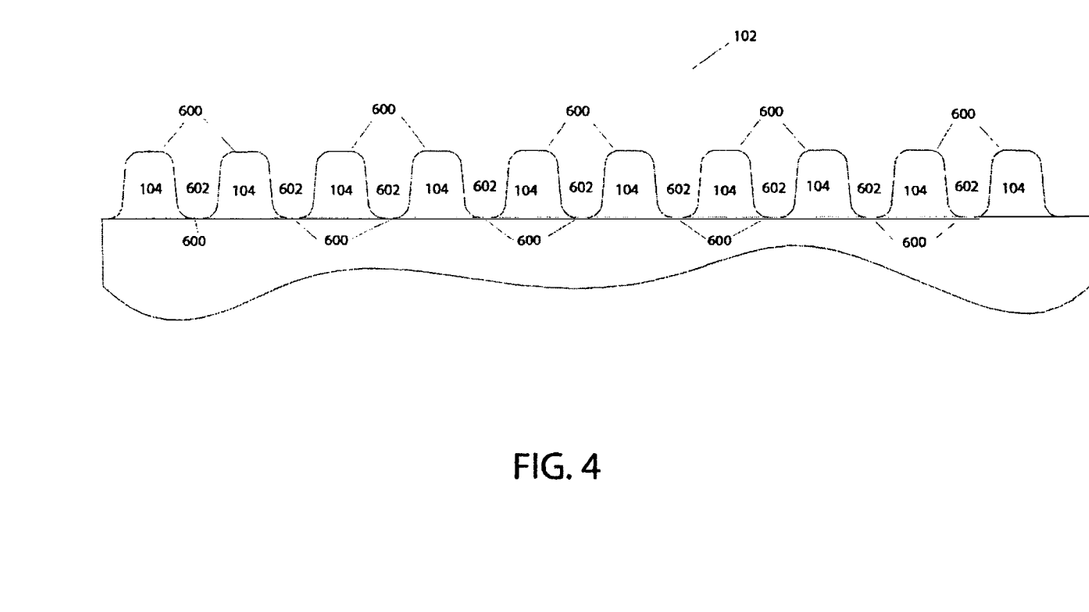
FIG. 4 is a side partial close-up, cross-sectional view of cutting teeth of the cutter head of the first embodiments of FIG. 1.

Referring next to FIG. 4, a side partial close-up, cross-sectional view is shown of the cutting teeth 104 of the cutter head 100 of the first embodiment of FIG. 1.

Shown are the position of the cutting teeth 104 from adjacent ones of the carbide bars 102 at a particular adjacent angular positions around the circumference of the cutter head 100 as the cutter head 100 spins. As can be seen, adjacent rows of the cutting teeth 104 are offset from one another, such that adjacent corrugations are formed by the adjacent ones of the cutting teeth 104, wherein as each row of cutting teeth 104 passes over the interior of the circular tube every other corrugation is formed by every other row of cutting teeth 104 allowing additional spacing between the cutting teeth 104 of one set of cutting teeth 104 for the escape of tailings or cuttings.

As further illustrated in FIG. 4, the lands 600 formed between the corrugations 602 are chamfered. This chamfering is preferable from an electromagnetic stand point in the wave guide.

The apparatus efficiently cuts multiple internal annular grooves (corrugations) on the interior surface of circular tubes that can have a length to diameter ratio limited only by the length chosen for the apparatus. More specifically, one feature of the apparatus consists of a multi-toothed ganged rotary cutter that orbits the inner surface of the circular tube, rotating about its axis many hundreds of times during one orbit around the tube circumference. This cutter head 100 has an even number of carbide bars 102 equally spaced around its circumference. Each carbide bar 102 has a row of cutting teeth 104 that have twice the spacing of the corrugations; that is, one bar of teeth cuts every other corrugation of the group. The cutting teeth 104 in adjacent carbide bars 102 are staggered, so that alternate carbide bars 102 cut interleaving group of corrugations.

This has three advantages: there is sufficient space between teeth for a robust grinding wheel that forms the teeth; there is space for the chips that are formed during the cutting operation; and it is possible to do a finishing cut on the inner diameter surface of the circular tube. This third advantage means that the burrs that normally form at the edges of the grooves (corrugations) can be removed as the cutting teeth 104 reach the full groove depth.

Beyond that, the corners of the land that remains between grooves can be given a radius or chamfer as the cutting teeth 104 reaches final depth, and the bottom of the groove (corrugation) will be perfectly concentric with the final inner diameter of the circular tube. These two details of the grooves help facilitate efficient transmission of microwave power.

Other features, described here in below, are means of controlling the radial position of the cutter head 100, its orbiting movement, and its parallelism with respect to the tube axis, and a means of driving the cutter head 100 rotation around its axis.

Figure 5:
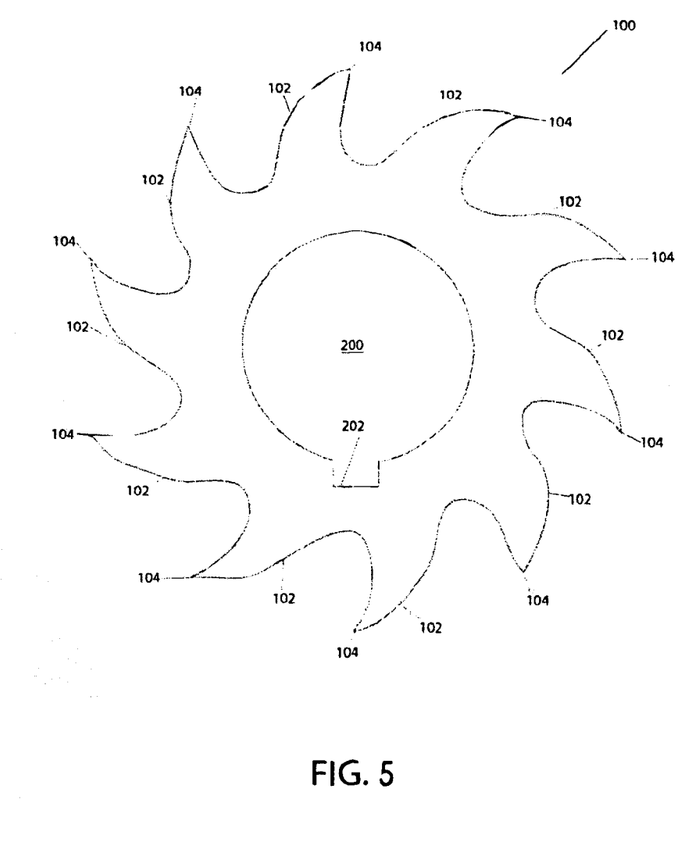
FIG. 5 is a front end view of a of a cutter head in accordance with a second embodiment of the present invention.

Referring next to FIG. 5, a front end view is shown of a cutter head 100 in accordance with a second embodiment of the present invention.

Shown is the cutter head 100, the interior hole 200, key notch 202, the carbide bars 102 and the cutting teeth 104.

Ten carbide bars 102 are shown at 36 degrees angular offset between each of the carbide bars 102 about the circumference of cutter head 100.

Figure 6:
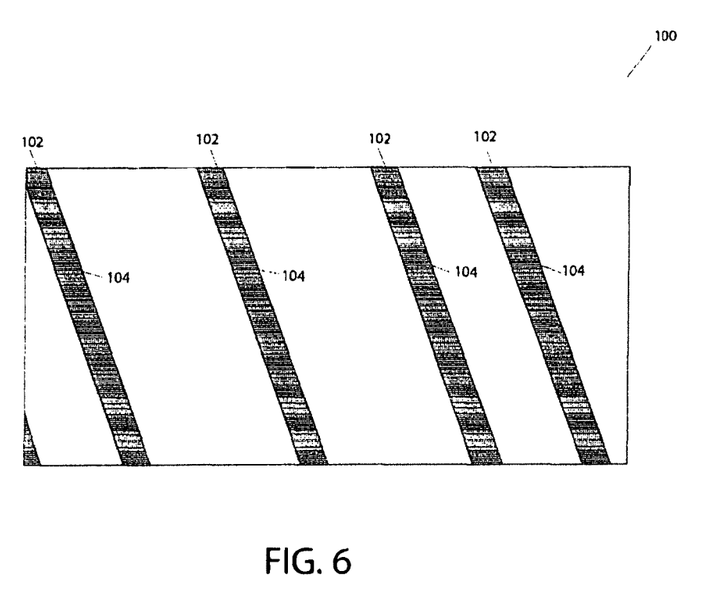
FIG. 6 is a top view of the cutter head in accordance with the second embodiment of FIG. 5.

Referring next to FIG. 6, a top view is shown of the cutter head 100 in accordance with the second embodiment of FIG. 5.

Shows the cutter head 100, carbide bars 102, and cutting teeth 104.

As can been seen the carbide bars 102 are set forth in a helical arrangement relative to a central axis to the cutter head 100 so that not all of the cutting teeth 104 cut across the interior surface of the circular tube parallel to the interior longitudinal axis of the circular tube, thereby reducing the friction variation seen by the cutter head 100 as it spins about its longitudinal axis.

Figure 7:
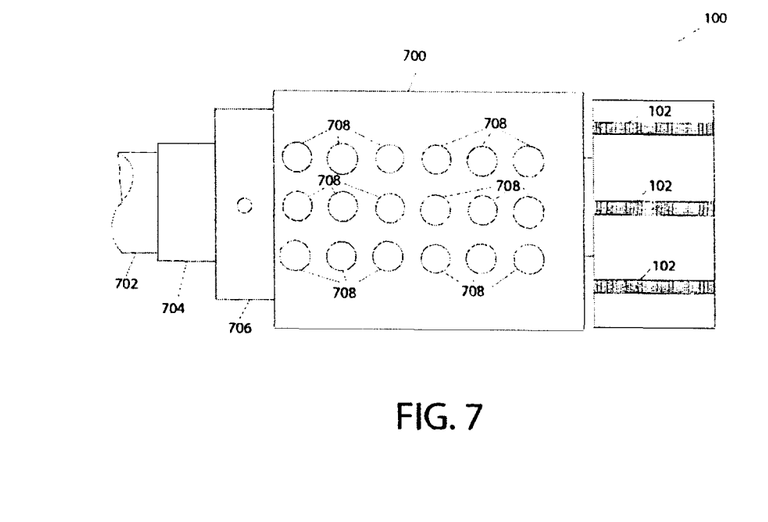
FIG. 7 is a top view of a cutter head and mandrel of the first embodiment of FIG. 1.

Referring next to FIG. 7, a top view is shown of a cutter head 100 and mandrel 700 of the first embodiment of FIG. 1.

FIG. 7 shows the details of the mandrel 700, the mechanism for radially extending and retracting the cutter head 100 inside the tube to be corrugated.

Shown is the cutter head 100, carbide bars 102, cutting teeth 104, drive shaft 702, inner eccentric 704 and outer eccentric 706, a mandrel 700 and a plurality of spring loaded ball plungers 708.

The cutter head 100 trails the mandrel 700 as the cutter head 100 progresses in a step-wise fashion up the interior of the circular tube, so that the mandrel 700 and spring-loaded ball plungers engage the circular tube on an uncorrugated (uncut) surface, before the cutter head 100 cuts the corrugations into the interior surface of the circular tube.

The drive shaft 702 drives the cutter head 100 in order to spin the cutter head 100 as it is applied to the interior surface of the circular tube, allowing the cutting teeth 104 to cut corrugation into the interior surface of the circular tube. The inner eccentric 704 and the outer eccentric 706 are rotated relative to one another so as to control the offset between the central axis of the circular tube and the central axis of the cutter head 100.

The spring loaded ball plungers 708 ride against the interior surface of the circular tube at approximately the same orientation as the interior surface against which the cutting of the interior corrugation is taking place. That way, both the cutter and the ball plungers push the mandrel against the tube wall opposite the surface being cut. By rotating the inner eccentric 704 and outer eccentric 706 together (simultaneously), the cutter head 100 orbits the interior surface of the circular tube thereby cutting the interior corrugation uniformly around the entire interior circumference of interior surface of the circular tube.

Figure 8:
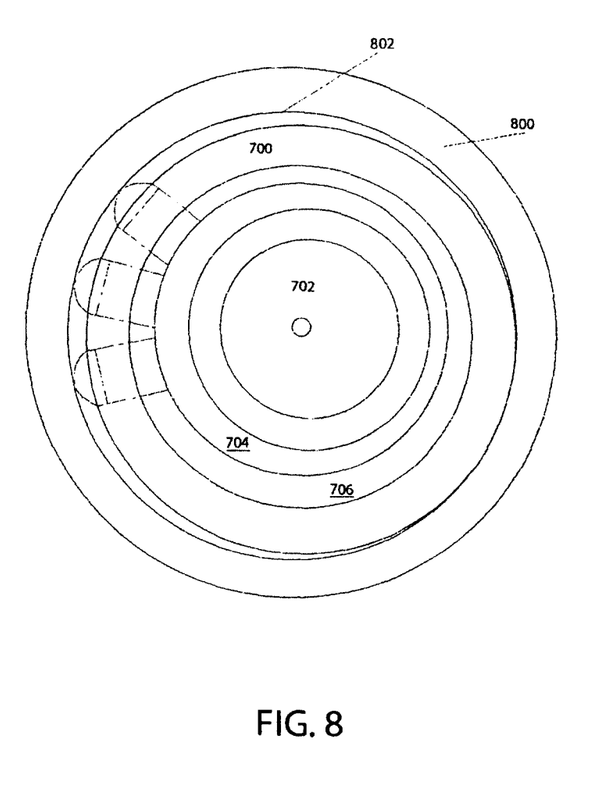
FIG. 8 is an end cross-sectional view of the mandrel of the first embodiment of FIG. 1.

Referring next to FIG. 8, an end cross-sectional view is shown of the mandrel 700 of the first embodiment of FIG. 1.

Shown is the circular tube 800, the mandrel 700, spring loaded ball plungers 708, the outer eccentric 706, the inner eccentric 704, and the drive shaft 702.

The spring loaded ball plungers 708 are disposed against the interior surface 802 of the circular tube 800 on one side and the mandrel 700 is disposed against the interior surface 802 of the circular tube 800 on the other. The central axis of the drive shaft 702 is offset from the central axis of the circular tube 800 by relative rotation of the inner eccentric 704 and outer eccentric 706, such that the axis of the drive shaft 702 and the axis of the circular tube 800 can be brought into alignment or out of alignment, juxtaposing the cutter head 100 against the inter surface of the circular tube 800 when the axis of the drive shaft 702 and the axis of the circular tube 800 are brought into misalignment. Similarly, the cutting teeth 104 are pulled away from the interior surface 802 of the circular tube 800 when the inner eccentric 704 and outer eccentric 706 are rotated relative to one another to bring the central axis of the drive shaft 702 and the central axis of the circular tube 800 into alignment. Rotation simultaneously of the inner eccentric 704 and of the outer eccentric 706 cause the cutter head 100 to orbit about the surface of the circular tube 800, when the axis of the drive shaft 702 and the axis of the circular tube 800 are in misalignment, and cutting teeth 104 are applied to the interior surface 802 of the circular tube 800.

One feature of certain embodiments is the mandrel 700 that is supported radially by the smooth wall (yet to be corrugated) inside diameter of the interior surface 802 of the circular tube 800. The length of the tube to be corrugated is then limited only by the length of the shafting that moves the mandrel 700 inside the tube. To allow for a small clearance between the mandrel 700 and the inside of the tube while maintaining an accurate corrugation depth, the spring loaded ball plungers 708 push the mandrel 700 against the tube inside wall interior surface 802 approximately 180° from the sector being corrugated at that instant. As the mandrel 700 rotates inside the tube, the ball plungers as well as the cutter head 100 are pushing the mandrel 700 against the opposite wall to maintain a constant corrugation depth.

The shaft driving the cutter head 100 (the drive shaft 702) rotates at a high speed (~300 RPM) inside a bushing (the inner eccentric 704) and is parallel, but not coaxial, with the axis of the tube being corrugated. The inner eccentric 704 turns a fraction of one revolution inside the outer eccentric 706 (which is also the outer part of the mandrel 700) during the radial extension and retraction of the cutter head 100. There is one relative orientation of the inner and outer eccentrics for which the cutter arbor (cutter head 100) is concentric with the circular tube 800 being corrugated and the cutter head 100 is also centered and therefore fully retracted as the inner eccentric 704 and outer eccentric 706 are rotated with respect to (relative to) each other, the cutter head 100 moves outward to a maximum of twice the offset "d" when the relative rotation reaches 180°. A mechanism to be described can set the relative angle $A_y$ at any value in the range 0-180° depending on the corrugation depth required. The cutter head 100 is spinning about its axis at a predetermined speed before the outward radial movement begins, and the entire mandrel 700 also begins to rotate at a low speed (typically <1 RPM). When the preset $A_p$ is reached, the inner and outer eccentrics rotate together and the mandrel 700 executes a full 360° revolution. At that point, the inner eccentric 704 rotates in reverse to bring the cutter head 100 back to the center of the tube. The mandrel 700 is then drawn upward (the machine and tube are preferably vertical to facilitate chip removal, with the cutter starting at the bottom end) a vertical step equal to the width of the cutter head 100 and the process repeated. The vertical geometry is also a feature essential to efficient production, because having countless small chips flowing over a horizontal corrugated surface can greatly increase the cost of subsequent cleaning.

Figure 9:
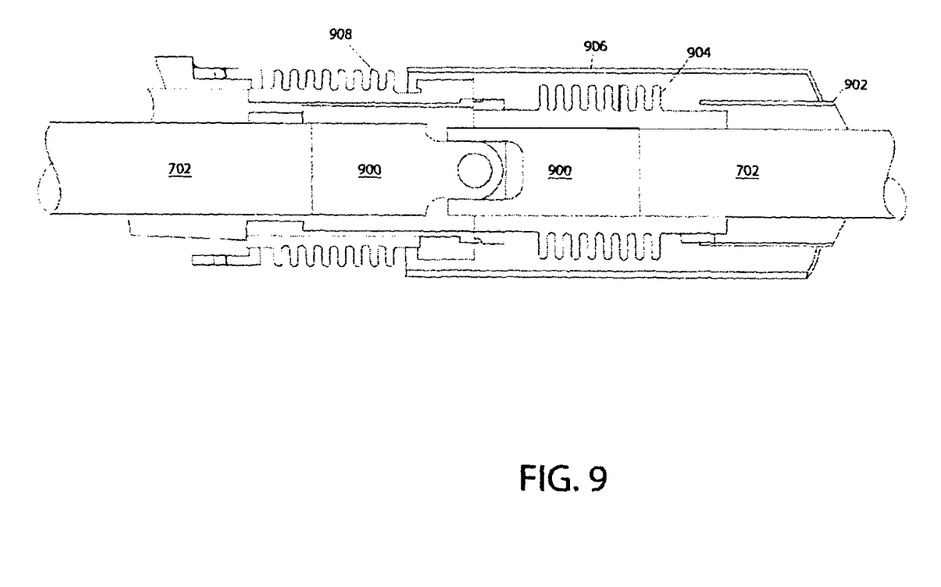
FIG. 9 is a side cross-sectional view of a universal joint and bellows arrangement for use in the first, and second embodiments of FIGS. 1 and 5.

Referring next to FIG. 9, a side cross-sectional view is shown of a universal joint and bellows arrangement.

Shown are the drive shaft 702, a universal joint 900, an inner control cylinder 902, an inner bellows 904, an outer control cylinder 906, and an outer bellows 908.

The drive shaft 702 is used to impart a rotational force onto the cutter head 100 so as to spin the cutter head 100. The inner control cylinder 902 is used to rotate the inner eccentric 704 and outer control tube is use to rotate the outer eccentric 706. Because the cutter head 100 axis of rotation (which is also the drive shaft 702 longitudinal axis) may be offset relative to the central axis of the circular tube 800, some flexibility is required in the drive shaft 702. This flexibility is provided by the universal joint 900.

In a similar fashion, the inner bellows 904 provide this flexibility for the inner control tube (which together envelop the universal joint 900 and the drive shaft 702), and outer bellows 908 provide this flexibility for the outer control tube (which together envelop the inner bellows 904 and the inner control tube).

Thus, another important feature of the present embodiment is the means for driving the cutter arbor (cutter head 100) and the inner eccentric 704 and the outer eccentric 706 while keeping the cutter arbor parallel with the inner diameter of the tube being corrugated (i.e., parallel to the longitudinal axis of the circular tube 800), even while the cutter arbor and inner eccentric 704 axes are executing a circular orbit around the longitudinal axis. If the rotational axis of the cutter head 100 tilts with respect to the longitudinal axis of the circular tube 800, there will be a visible period between each group (as defined by the number of corrugations 602 cut by the cutting teeth 104 on the carbide bars 102) of corrugations 602. This periodicity in the corrugations 602 can result in reflection or mode conversion of the microwave power propagating in the corrugated circular waveguide.

The spring loaded ball plungers 708 push the mandrel 700 against the inner wall of the tube and keep it parallel with the longitudinal axis of the tube, provided that side forces from the drive shaft 702 driving the cutter head 100 and the inner control cylinder 902 and the outer control cylinder 906 surrounding the drive shaft 702 that drive the inner eccentric 704 and the outer eccentric 706, respectively, do not overcome the spring forces exerted by the spring loaded ball plungers 708. These side forces are minimized by having a universal joint 900 in the drive shaft 702 near where it emerges from the mandrel 700, and the inner bellows 904 and the outer bellows 908 in the inner control cylinder 902 and the outer control cylinder 906 that drive the inner eccentric 704 and the outer eccentric 706. There are a similar pair of bellows at the other end of the drive tubes, followed by hollow shaft stepper motors that control the relative eccentric angle and run in synchronism after the cutter depth is established to drive the 360° orbital rotation of the cutter.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of forming corrugations on an interior surface of a cylindrical tube:
   inserting a cutter head into the cylindrical tube;
   inserting, after the inserting the cutter head, a mandrel into the cylindrical tube following the cutter head;
   directing the cutter head to a furthest position within the cylindrical tube at which said corrugations are to be formed;
   spinning the cutter head;
   misaligning an axis of rotation of the cutter head and a longitudinal axis of the cylindrical tube while maintaining the axis of rotation parallel to the longitudinal axis, wherein cutting teeth of the cutter head are brought into contact with the inner surface;
   orbiting the axis of rotation of the cutter head around the longitudinal axis while maintaining the axis of rotation parallel to the longitudinal axis, wherein the cutting teeth of the cutter head traverse the circumference of the inner surface, wherein first corrugations of uniform depth and spacing are formed in an annular pattern around the interior surface;
   moving the axis of rotation toward alignment with the longitudinal axis while maintaining the axis of rotation parallel to the longitudinal axis, wherein the cutting teeth of the cutter head are brought out of contact with the inner surface;
   pulling, after the moving, the cutter head toward the mandrel to a position adjacent to the first corrugations;
   again misaligning, after the pulling, the axis of rotation of the cutter head and the longitudinal axis of the circular tube while maintaining the axis of rotation parallel to the longitudinal axis, wherein cutting teeth of the cutter head are brought into contact with the inner surface;
   again orbiting the axis of rotation of the cutter head around the longitudinal axis while maintaining the axis of rotation parallel to the longitudinal axis, wherein the cutting teeth of the cutter head traverse the circumference of the inner surface, wherein second corrugations of uniform depth and spacing are formed in an annular pattern around the interior surface at the position adjacent to the first corrugations.

2. The method of claim 1 wherein said spinning comprises spinning a drive shaft.

3. The method of claim 2 wherein said spinning comprises spinning a universal joint interposed in said drive shaft.

4. The method of claim 1 wherein said misaligning comprises:
   rotating an inner control tube relative to an outer control tube.

5. The method of claim 1 wherein said misaligning comprises:

rotating an inner bellows interposed in an inner control tube relative to an outer bellows interposed in an outer control tube.

6. The method of claim 5 wherein said spinning comprises spinning a universal joint interposed in a drive shaft, wherein said universal joint, the inner bellows and the outer bellows cooperate to form a flexible region.

7. The method of claim 1 wherein said orbiting further comprises cutting said corrugations with cutting teeth.

8. The method of claim 7 wherein said orbiting further comprises cutting said corrugations with said cutting teeth, wherein said cutting teeth are on a plurality of carbide bars positioned about the circumference of the cutter head.

9. The method of claim 1 wherein said spinning said cutter head spins hundreds of times during each orbit of said cutter head around the longitudinal axis.

10. The method of claim 1 wherein said spinning includes forming grooves free of burrs.

11. The method of claim 1 wherein said spinning includes forming grooves comprising bottoms that are concentric with the inner diameter of the cylindrical tube.

12. The method of claim 1 wherein said spinning includes forming grooves that are annular and equally spaced.

13. The method of claim 1 further comprising orienting the circular tube vertically, and exiting cutting fluid from the circular tube in a downward direction.

14. The method of claim 13 wherein said inserting said cutter head comprises inserting said cutter head into a top of the circular tube.

15. The method of claim 14 wherein said pulling, after the moving, said cutter head comprises pulling said cutter head in an upward direction.

16. The method of claim 1 further comprising flowing cutting fluid through a plurality of cutting fluid exit holes.

17. The method of claim 1 further comprising flowing cutting fluid through a plurality of cutting holes from a cutting fluid manifold.

* * * * *